United States Patent [19]

Nakagaki et al.

[11] Patent Number: 4,652,910
[45] Date of Patent: Mar. 24, 1987

[54] AUTOMATIC BEAM CURRENT CONTROL WITH AN ENVELOPE DETECTOR FOR A COLOR TELEVISION CAMERA TUBE WITH A STRIPE FILTER

[75] Inventors: Shintaro Nakagaki, Fujisawa; Hiroshi Ichimura, Tokyo, both of Japan

[73] Assignee: Victor Company of Japan, Ltd., Yokohama, Japan

[21] Appl. No.: 556,173

[22] Filed: Nov. 29, 1983

[30] Foreign Application Priority Data

Nov. 30, 1982 [JP] Japan .................... 57-210238

[51] Int. Cl.⁴ .............. H04N 9/07; H04N 9/04; H04N 9/083; H04N 5/235
[52] U.S. Cl. ............................ 358/44; 358/43; 358/47; 358/219
[58] Field of Search ............ 358/41, 43, 44, 50, 358/52, 219; 388/217

[56] References Cited

U.S. PATENT DOCUMENTS

| | | | |
|---|---|---|---|
| 2,930,929 | 3/1960 | Shelton | 358/219 |
| 3,610,823 | 10/1971 | Haenen | 358/219 |
| 3,999,011 | 12/1976 | Sato et al. | 358/219 |
| 4,041,528 | 8/1977 | Miyoshi et al. | 358/47 |
| 4,365,271 | 12/1982 | Blom | 358/219 |
| 4,427,927 | 1/1984 | Nakamura | 358/219 |
| 4,593,321 | 6/1986 | Blom et al. | 358/219 |

FOREIGN PATENT DOCUMENTS 2722861 11/1977 Fed. Rep. of Germany .
2852901 6/1979 Fed. Rep. of Germany .
164669 10/1982 Japan ..................... 358/219

OTHER PUBLICATIONS

Lubszynski, H. G., et al., "Some Aspects of Vision Performance", *Journal Brit. I.R.E.*, May 1960, pp. 331-332.
Jay, Frank, Editor-in-Chief, IEEE Standard Dictionary of Electrical and Electronic Terms, Second Edition, 1977, pp. 21, 46.
National Convention Preprint of The Institute of Television Engineers of Japan, pp. 91 and 92 of 1974 edition.
Institute of Television Engineers of Japan, vol. 11, p. 22, date unknown.

*Primary Examiner*—James J. Groody
*Assistant Examiner*—Randall S. Svihla
*Attorney, Agent, or Firm*—Cushman, Darby & Cushman

[57] ABSTRACT

A feedback control loop for controlling the intensity of a scanning electron beam of an image pickup tube of a color TV camera which is especially useful in a single tube color TV camera with a stripe filter, comprises an envelope detector for detecting the envelope of an output video signal derived from the image pickup tube. An envelope signal from the envelope detector is then compared with a reference threshold by a comparator so that a voltage applied to a control grid of the pickup tube is controlled in accordance with the amplitude of the envelope signal, thereby increasing the intensity of the scanning electron beam applied to a portion of a photoelectric converting layer when the brightness at the portion is high. As a result, an ideal multi-color output video signal is obtained irrespective of the brightness of a subject to be taken even if the intensity of the scanning electron beam is usually set to a relatively low value. In one embodiment, a circuit for amplifying high-frequency components of the output video signal is employed for compensating for a modulation characteristic of typical pickup tubes having a poor high frequency response.

5 Claims, 14 Drawing Figures

FIG. 1A PRIOR ART
FIG. 1B PRIOR ART
FIG. 1C PRIOR ART
FIG. 1D PRIOR ART
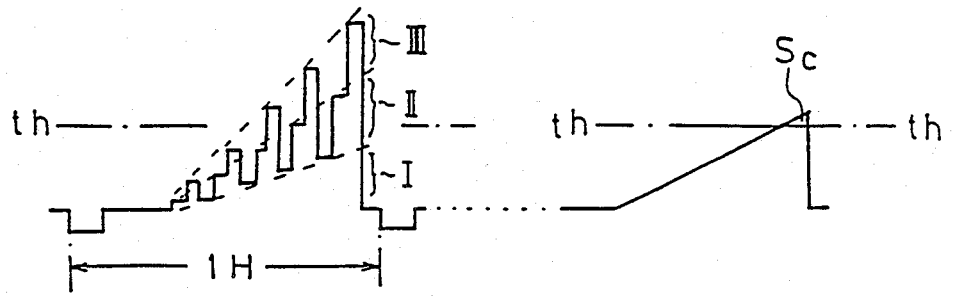
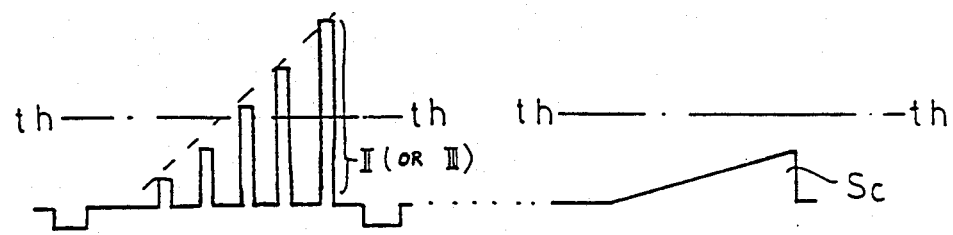
FIG. 2
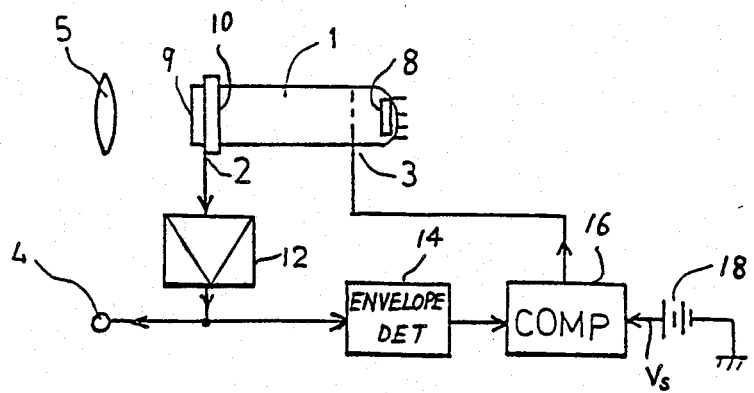

AUTOMATIC BEAM CURRENT CONTROL WITH AN ENVELOPE DETECTOR FOR A COLOR TELEVISION CAMERA TUBE WITH A STRIPE FILTER

BACKGROUND OF THE INVENTION

This invention relates generally to color television image pickup devices using a color separation stripe filter for producing a multi-color video signal, and more particularly the present invention relates to a circuit arrangement for such a color TV pickup device.

So-called single-tube color TV cameras with a color separation stripe filter are widely used for producing a multi-color video signal, and such a single-tube color TV camera usually comprises a photoconductive layer at its photoelectric converting portion. The photoconductive layer is used to store therein charges in accordance with the amount of incident light, where the stored charges are then discharged with a scanning electron beam applied thereto so as to obtain an output video signal. The intensity of the scanning electron beam is set to a relatively low value so that a uniform modulation characteristic is obtained throughout the entire target of the pickup tube, and an output signal showing a desired degree of modulation is obtained. As a result of the use of such a relatively low intensity scanning beam, some charges stored in a portion where the amount of incident light is large, cannot be fully discharged. Namely, the modulation degree is deteriorated at a bright portion. Therefore, the output video signal does not accurately represent the brightness of a taken image, especially at a bright portion, deteriorating the quality of an image which will be reproduced on a CRT.

Such an undesirable phenomenon is called insufficient beam phenomenon, and conventionally in order to prevent the modulation degree from being deteriorated by such insufficient beam phenomenon, the intensity of the scanning electron beam is changed in accordance with the amount of light incident on an image pickup tube. However, in a single-tube TV camera, the output video signal is a multi-color video signal which includes high frequency components. Therefore, when the output video signal is used as it is for controlling the intensity of the scanning electron beam, the intensity control is effected with a considerable time delay due to time lag elements inherently existing within the control loop. As a result, such a feedback beam intensity control cannot catch up with the image on the photoelectric converting layer, resulting in unsatisfactory color reproducing images on a CRT.

Since such a time delay is caused by the high-frequency components of the output video signal, beam intensity control for the pickup device of such a single-tube TV camera has hitherto been effected by using only low frequency components of the output video signal. However, when beam intensity feedback control is effected by using the low frequency components of the output video signal, there arises a problem as follows. When the output video signal does not have low frequency components or when the low frequency components are of very low level, the beam intensity feedback control cannot be effectively carried out. As a result, the intensity of the scanning electron beam does not increase in accordance with the brightness of the taking image resulting in deterioration of the reproducing image quality.

SUMMARY OF THE INVENTION

The present invention has been developed in order to remove the above-described drawbacks inherent to the conventional circuit arrangement for a color TV camera.

It is, therefore, an object of the present invention to provide a new and useful circuit arrangement for a color TV camera from which a satisfactory output video signal can be derived without suffering from undesirable insufficient beam phenomenon.

According to a feature of the present invention, the output signal from an image pickup tube is processed to detect the envelope thereof so as to control the intensity of the scanning electron beam by using the envelope of the output video signal.

In accordance with the present invention there is provided a circuit arrangement for a color TV camera having a image pickup device arranged to be scanned by an electron beam, comprising an envelope detector responsive to an output video signal from the pickup device for producing an output envelope signal, and means for changing the intensity of said electron beam in accordance with said envelope signal.

BRIEF DESCRIPTION OF THE DRAWINGS

The object and features of the present invention will become more readily apparent from the following detailed description of the preferred embodiments taken in conjunction with the accompanying drawings in which:

FIGS. 1A through 1D are waveforms useful for understanding the operation of a conventional circuit arrangement;

FIG. 2 is a schematic block diagram of a first embodiment of the present invention;

The same or corresponding elements and parts are designated at like reference numerals throughout the drawings

DETAILED DESCRIPTION OF THE INVENTION

Figures 3A, 3B:
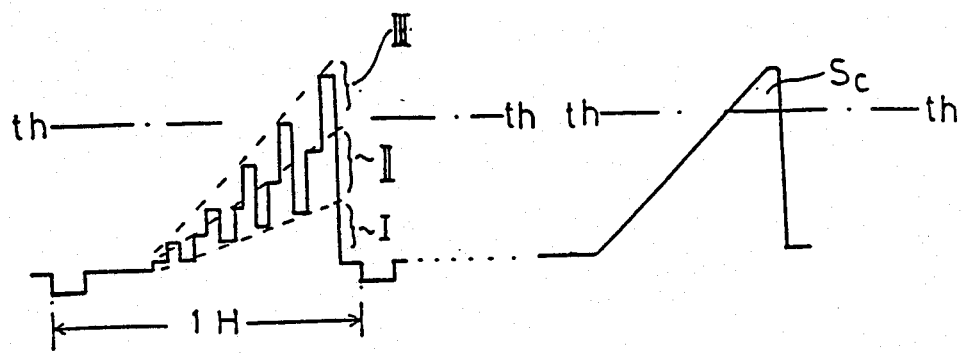
FIGS. 3A through 3D are waveforms useful for understanding the operation of the circuit arrangement of FIG. 2.

Prior to describing the present invention, the abovementioned problem inherent to conventional circuit arrangement will be described with reference to FIGS. 1A through 1D. FIG. 1A is a waveform chart showing an output video signal from an image pickup device under a condition that white light or all color light rays from a subject are applied through a color separation stripe filter to a photoelectric converting portion of the image pickup device, where the color separation filter has a repetitive pattern of three kinds of color stripes which pass white light, cyan light and green light respectively. The waveform of FIG. 1A shows the output video signal outputted during a single horizontal scanning period (1H). Although the color separation stripe filter has a large number of stripes, the output signal waveform of FIG. 1A is shown as if the number of stripes is extremely small for simplicity. The reference I indicates a signal component corresponding to green light which is transmitted through all the color stripes of the filter. The reference II indicates a signal component corresponding to blue light which is transmitted through cyan stripes and colorless stripes. The reference III indicates a signal component corresponding to red light which is transmitted through only colorless stripes capable of transmitting all color light rays.

In order to avoid the above-mentioned insufficient beam phenomenon in the prior art, low frequency components of the output video signal are used as a control signal Sc which is compared with a threshold th-th as shown in FIG. 1B so as to increase the intensity of the scanning electron beam when the control signal Sc exceeds the threshold th-th. However, in the case that the low frequency components have a relatively low level such that the amplitude of the control signal Sc is below the threshold th-th as shown in FIG. 1D, the intensity of the scanning electron beam is not increased even if the light rays incident on the pickup tube has a magnitude such that the output video signal has a relatively large amplitude as shown in FIG. 1C. As a result, it is apparent that the intensity of the scanning electron beam is insufficient at a portion where the output video signal exceeds the threshold th-th.

Referring now to FIG. 2 a first embodiment of the present invention is shown by way of a block diagram. An image pickup tube 1 of the type arranged to produce a multi-color output video signal is provided to receive light rays from a subject, where the light rays are arranged to be incident on the pickup tube through a taking lens 5. The pickup tube 1 has an electron gun 8 which produces a scanning electron beam directed to a photoelectric converting layer 10. The pickup tube 1 also has a face plate 9 with color stripe filter (unshown), an output signal electrode 2 from which an output video signal is derived, and a control electrode or grid 3 for controlling the amount of the electron beam. In addition to the above-described arrangement, which is substantially the same as the conventional one, the circuit arrangement comprises a preamplifier 12 responsive to the output video signal from the output signal electrode 2, an envelope detector 14 responsive to an output signal from the preamplifier 12, and a comparator 16 for comparing an output signal from the envelope detector 14 with a reference voltage Vs from a reference voltage source 18. The output signal from the preamplifier 12 is also fed to a color video output terminal 4 from which an output multi-color video signal is derived.

Figures 3C, 3D:
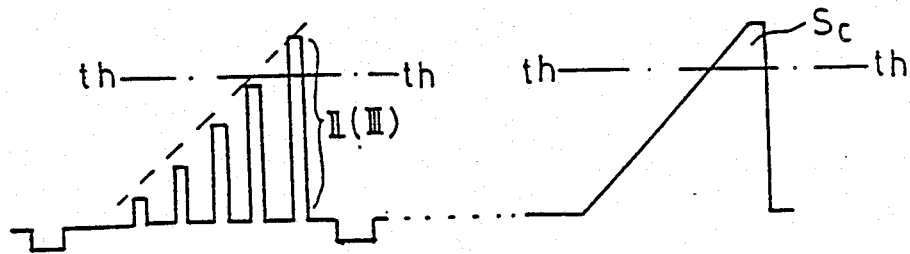

The first embodiment of FIG. 2 operates as follows. FIG. 3A and 3C show the waveform of the output video signal from the preamplifier 12 in the same manner as FIGS. 1A and 1B, while FIGS. 3B and 3D show the waveform of the output signal from the envelope detector 14 responsive to the output video signal shown in FIGS. 1A and 1C respectively. Since the envelope detector 14 detects the envelope of the output video signal from the preamplifier 12, the amplitude of the output signal Sc from the envelope detector 14 faithfully follows the envelope of the video signal as will be seen from the relationship between FIGS. 3A and 3B and FIGS. 3C and 3D. The envelope signal Sc or control signal is then compared with a threshold th-th to control the intensity of the scanning electron beam from the electron gun 8 by the control grid 3. Therefore, the intensity of the scanning electron beam can be increased in accordance with the amplitude of the envelope signal irrespective of the frequency component of the output video signal.

Figures 4, 5:
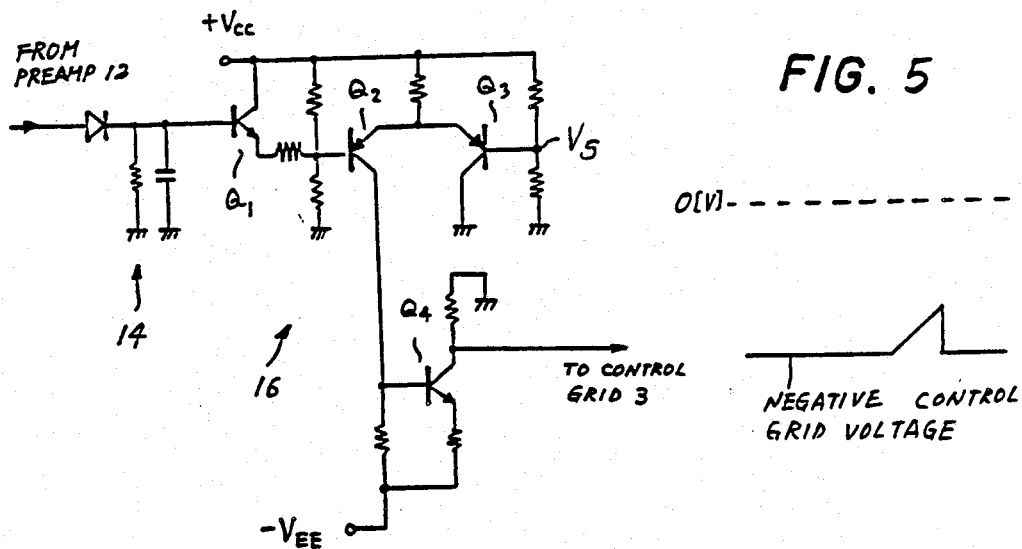
FIG. 4 is a circuit diagram showing a main part of FIG. 2.
FIG. 5 is a waveform chart showing the control signal fed to the pickup tube of FIG. 2.

The above embodiment of FIG. 2 will be further described in greater detail with reference to FIG. 4 which shows a circuit diagram of the envelope detector 14, and the comparator 16. The envelope detector 14 comprises a diode, a resistor and a capacitor in the same manner as in well known envelope detector for obtaining an output envelope signal indicative of the envelope of the output video signal from the preamplifier 12. The comparator 16 comprises four transistors Q1, Q2, Q3 and Q4, where the transistor Q1 is responsive to the envelope signal from the envelope detector 14 and the transistor Q3 is responsive to the reference voltage Vs produced by a voltage divider. The envelope signal Sc is clipped by the transistor Q1 such that the envelope signal Sc is applied to the base of the transistor Q4 when it exceeds the threshold defined by the reference voltage Vs. The clipped voltage is then amplified by the transistors Q2, Q3 and Q4 so that an output control signal is derived from the collector of the transistor Q4. Since the emitter of the transistor Q4 is connected to a negative power source $-V_{EE}$ of a predetermined negative voltage, such as $-100$ V, the voltage at the collector of the transistor Q4 is of negative value, such as $-60$ V when the envelope signal Sc does not exceed the reference Vs. As the envelope signal Sc exceeds the reference Vs, the voltage at the collector of the transistor Q4 rises toward zero voltage as shown in FIG. 5. Since this negative voltage is applied to the control grid 3 of the pickup tube 1, the change in voltage toward zero voltage results in an increase in the amount of scanning electron beam as is well known in the art.

From the above it will be understood that the output stage transistor Q4 is supplied with a predetermined negative voltage as a source of power, so that a resultant output control signal fed to the control grid 3 of the pickup tube 1 is normally set to a suitable value. Since the way of controlling the amount of scanning electron beam by changing the voltage applied to the control grid of a pickup tube is well known as disclosed in National Convention Preprint of The Institute of Television Engineers of Japan, pages 91 and 92 of 1974 edition, no further detailed description thereabout is made.

Although the circuit arrangement of FIG. 2 operates satisfactorily when the pickup tube has an ideal amplitude response such that the amplitude response is satisfactory at a frequency range of a component modulated by a color signal component, the amplitude response of typical pickup tubes generally have a relatively low response at high frequencies. Therefore, when such a typical pickup tube is used, the multi-color video signal is preferably amplified in connection with high frequency components.

Figure 6:
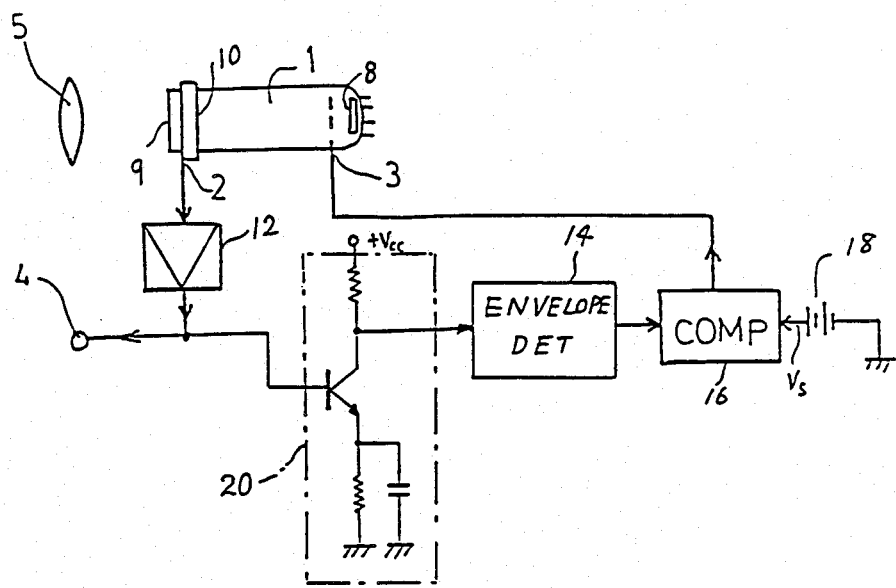
FIG. 6 is a schematic diagram showing a second embodiment of the present invention.

Hence, reference is now made to FIG. 6 which shows a second embodiment of the present invention. The second embodiment differs from the first embodiment in that a circuit for amplifying high frequency components is additionally provided between the preamplifier 12 and the envelope detector 14. Namely, a high-frequency component amplifying circuit 20 is employed to amplify only high frequency components of the output signal from the preamplifier 12 for producing an output signal whose high frequency components have been amplified. Therefore, even if the amplitude response of the pickup tube 1 is deteriorated at high frequencies so that the amplitude of output video signal component modulated by a color component is small, the intensity of the scanning electron beam can be satisfactorily controlled because the high frequency components of the multi-color video signal are amplified before being applied to the envelope detector 14.

Figure 7:
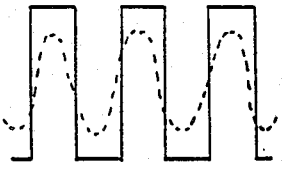
FIGS. 7 and 8 are waveform charts showing the operation of the second embodiment of FIG. 6.
Figure 8:
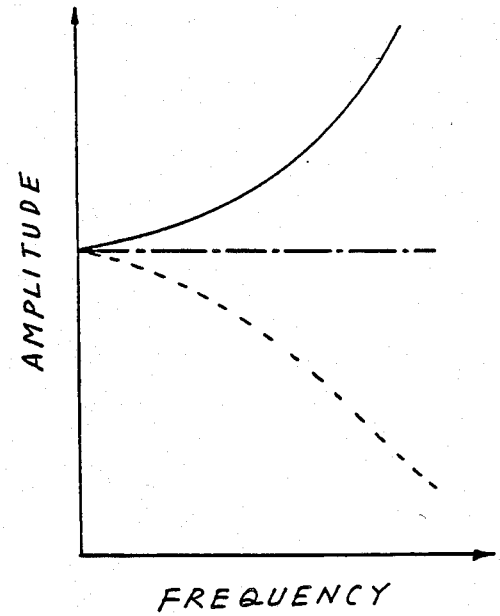

The high-frequency component amplifying circuit 20 comprises a common-emitter transistor amplifier as shown, which amplifier is arranged to function as an emitter peaking circuit. FIG. 7 shows two waveforms of a high frequency component respectively obtained from a deteriorated modulation characteristic pickup tube (see dotted curve) and an undeteriorated amplitude response pickup tube (see solid curve). Assuming that the amplitude response of the pickup tube 1 is expressed by a dotted curve of FIG. 8, the frequency response of the emitter peaking circuit shows a characteristic as shown by a solid curve. Therefore, when the amplitude response of the pickup tube 1 is poor such that its frequency response at high frequencies is low, the frequency response is compensated for by the frequency response of the emitter peaking circuit as indicated by a dot-dash curve. The frequency response of the emitter peaking circuit is determined such that the peak value of the output signal resulted from a deteriorated amplitude response of the pickup tube is compensated to more nearly equal the peak value that would result from undeteriorated amplitude response of the same.

From the above description it will be understood that the circuit arrangement according to the present invention is capable of controlling the intensity of the scanning electron beam such that the beam intensity is able to accurately follow the amount of light incident on the image pickup tube. As a result, undesirable insufficient beam phenomenon is avoided, and therefore it is possible to produce a desirable output video signal with which a high quality reproducing picture will be obtained.

The above-described embodiments are just examples of the present invention, and therefore, it will be apparent for those skilled in the art that many modifications and variations may be made without departing from the spirit of the present invention.

What is claimed is:

1. A circuit arrangement for use with a color TV camera having an image pickup device which has a face plate provided with a color separation stripe filter and produces a video signal amplitude-modulated by the color separation strip filter and which has an electron gun for emitting an electron beam which scans a photoconductive layer thereof, comprising:
    (a) envelope detector means for detecting an envelope of the amplitude-modulated video signal from the image pickup device and for producing an output signal indicative thereof; and
    (b) means for changing the intensity of the electron beam as a function of the output signal from the envelope detector means when said output signal exceeds a predetermined threshold.

2. A circuit arrangement as claimed in claim 1, further comprising means for selectively amplifying high frequency components of said video signal more than low frequency components of said video signal before said video signal is applied to said envelope detector means.

3. A circuit arrangement as claimed in claim 2, wherein said amplifying means comprises a peaking circuit responsive to said video signal, said peaking circuit having a frequency response which compensates for the frequency response of the image pickup device by selectively amplifying different frequency bands with different gains, thereby selectively altering a characteristic of the video signal based on its frequency band and compensating for any frequency nonlinearities in the image pickup device.

4. A circuit arrangement as claimed in claim 1, wherein said changing means comprises a comparator responsive to said output signal and a reference voltage.

5. A circuit arrangement as claimed in claim 1, wherein said envelope detected by said envelope detector means is an amplitude envelope.

* * * * *